(12) United States Patent
Tucker

(10) Patent No.: US 8,146,628 B2
(45) Date of Patent: Apr. 3, 2012

(54) SHEAR TYPE TREE CUTTER

(76) Inventor: Donald C. Tucker, Montgomery, TX (US)

( * ) Notice: Subject to any disclaimer, the term of this patent is extended or adjusted under 35 U.S.C. 154(b) by 167 days.

(21) Appl. No.: 12/706,542

(22) Filed: Feb. 16, 2010

(65) Prior Publication Data

US 2011/0197998 A1    Aug. 18, 2011

(51) Int. Cl.
*A01G 23/08* (2006.01)
(52) U.S. Cl. .......................... 144/4.1; 144/34.1; 144/34.5
(58) Field of Classification Search ................... 144/4.1, 144/34.1, 34.5; 30/134, 228, 266; 241/101.71, 241/101.72, 101.74
See application file for complete search history.

(56) References Cited

U.S. PATENT DOCUMENTS

| | | | |
|---|---|---|---|
| 3,886,984 A * | 6/1975 | Engel | 144/4.1 |
| 3,976,111 A * | 8/1976 | Jonsson | 144/34.5 |
| 4,221,245 A | 9/1980 | Wildey | |
| 4,384,599 A * | 5/1983 | Dagenais | 144/34.5 |
| 5,503,201 A | 4/1996 | Strickland et al. | |
| 5,860,214 A * | 1/1999 | Morikawa et al. | 30/134 |
| 6,662,836 B1 | 12/2003 | Andersen | |
| 6,779,570 B2 | 8/2004 | Tardif | |
| 6,901,978 B2 | 6/2005 | Simpson | |
| 7,240,702 B2 | 7/2007 | Leseberg | |
| 7,431,059 B2 * | 10/2008 | Cochran | 144/24.12 |
| 7,654,293 B2 * | 2/2010 | Chen | 144/34.5 |
| 2009/0065094 A1 * | 3/2009 | Gault, Jr. | 144/34.5 |

* cited by examiner

*Primary Examiner* — Shelley Self
(74) *Attorney, Agent, or Firm* — Claude E. Cooke, Jr.; John J. Love; Cooke Law Firm

(57) ABSTRACT

A shear type tree cutter assembly is adapted to be mounted on a four wheel field vehicle. The assembly includes an anvil with a concave section for supporting the trunk of a tree. The blade portion has a convex portion that cooperates with the concave section of the anvil to shear the tree. The blade and anvil section also may include a straight portion useful for pruning brush and small limbs.

6 Claims, 3 Drawing Sheets

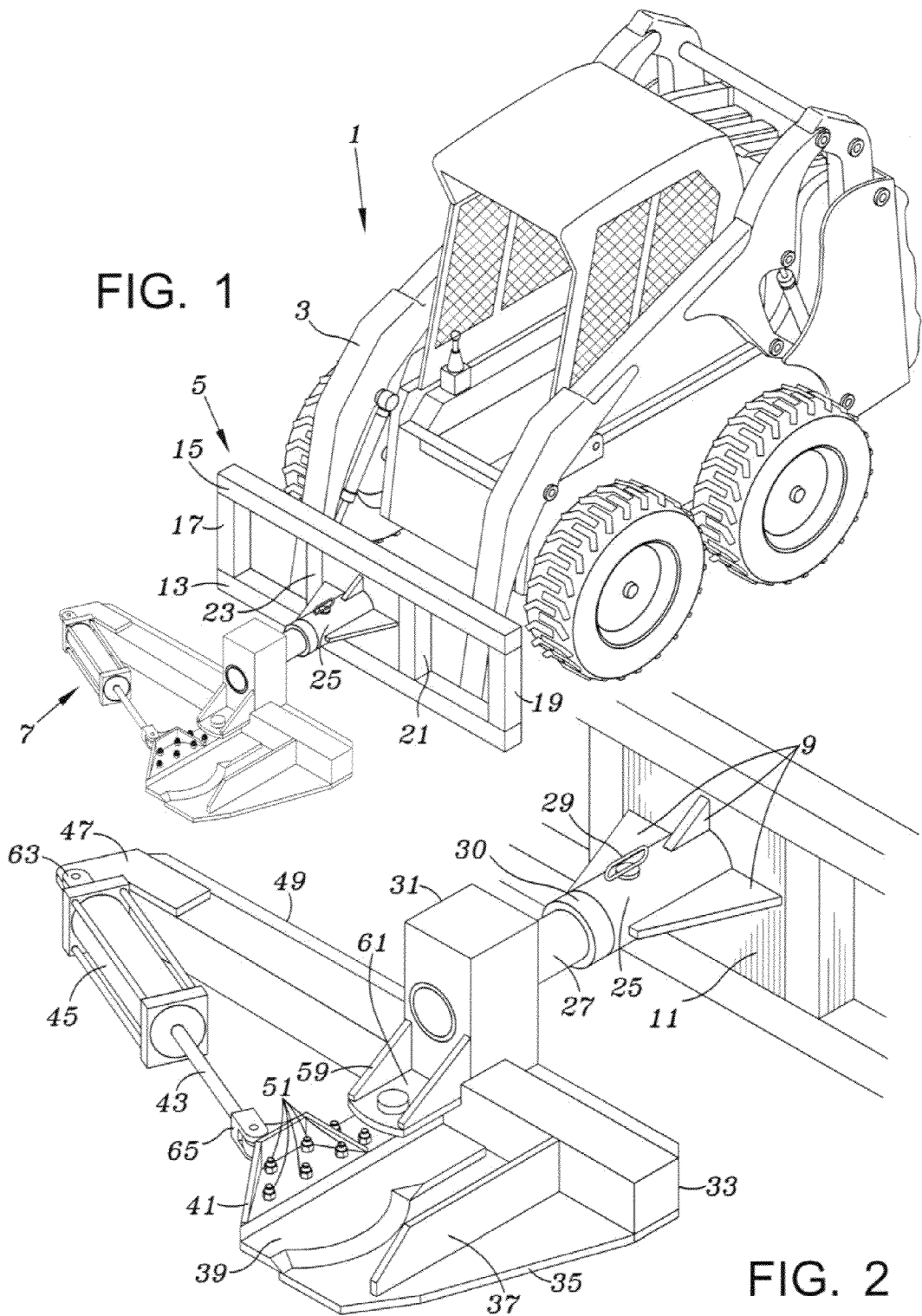

SHEAR TYPE TREE CUTTER

BACKGROUND OF INVENTION

1. Field of the Invention

This invention is a shear type tree cutter that is in the form of an attachment to a four wheel multipurpose field vehicle such as a Bobcat® or a four wheel front loader, for example. The shear tree cutter can easily be adapted to be attached to the coupling devices of skid loaders and front end tractor loaders. The attachment is capable of cutting down trees up to about six inches in diameter with a high degree of reliability and effectiveness at a relatively low cost.

2. Description of Related Art

Tree shearers are known in the prior art such as the one described in U.S. Pat. No. 5,503,201. This device utilizes two pivoted straight edge blades mounted on an attachment adapted to be coupled to a variety of different forms of front loader vehicles. U.S. Pat. No. 6,662,836 B1 discloses a tree shear attachment that includes a single straight blade that pivots toward a stationary straight jaw 92. The patent to Wildley U.S. Pat. No. 4,221,245 discloses a convex blade 23 moving toward indentation 50. For trees larger than 8" or more, Wildey uses a pivoted chain saw 24 to sever the tree.

BRIEF SUMMARY OF THE INVENTION

Applicant's invention resides in providing a rugged, extremely reliable shear type tree cutter that is capable of successfully cutting trees of larger diameter than similarly sized tree shears. This results in less down time for repairs. The invention also includes the ability to replace the cutting blade should it wear out. An additional aspect of the invention is the provision of a smaller pruning type cutting surface on the end of the blade for snipping off smaller trees and branches. The improved cutting capability is achieved by the unique shape of the shear blade and shearing anvil along with strategically positioned reinforcement members.

In another aspect of the invention, when the device is coupled to a front loader, a swivel mechanism can be provided to allow the tree cutter to be pivoted so that it can be used to trim branches from trees.

BRIEF DESCRIPTION OF THE SEVERAL VIEWS OF THE DRAWING(S)

FIG. 1 is a perspective view of the tree cutter coupled to a front loader tractor.

FIG. 2 is a perspective view of the tree cutter.

Figure 3:
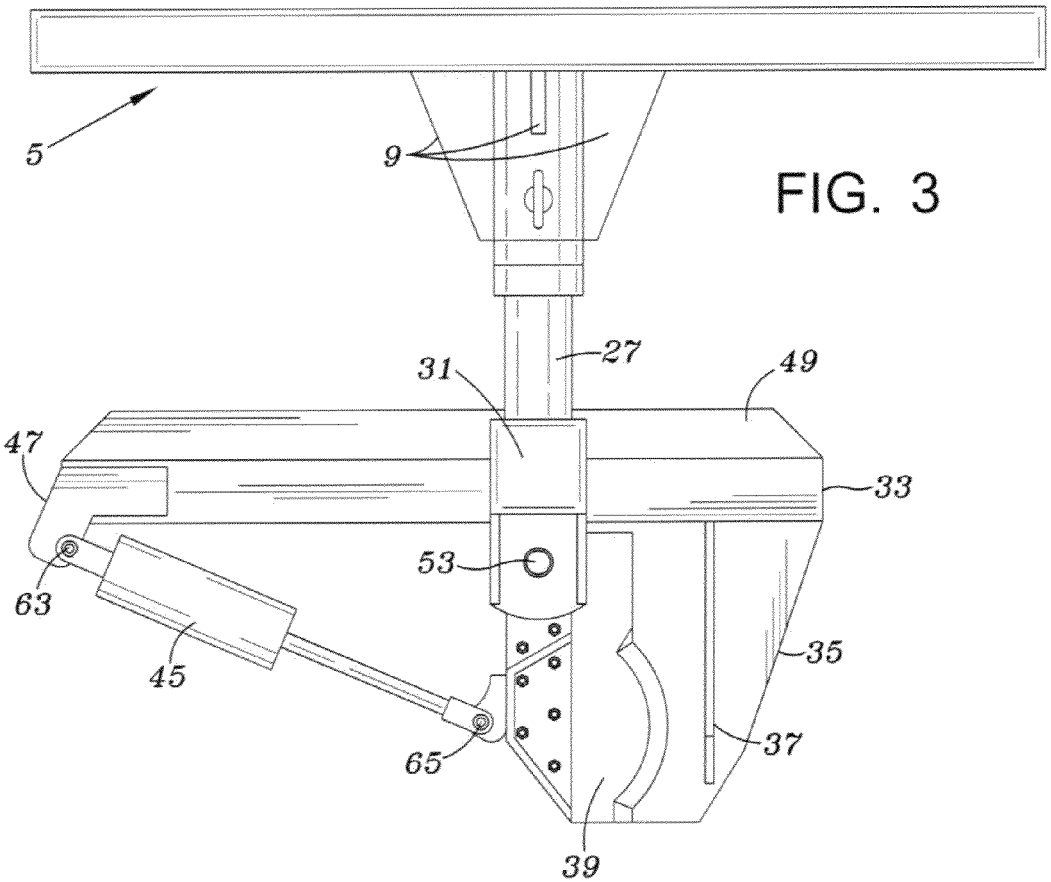
FIG. 3 is a top view of the tree cutter attachment.
Figure 4:
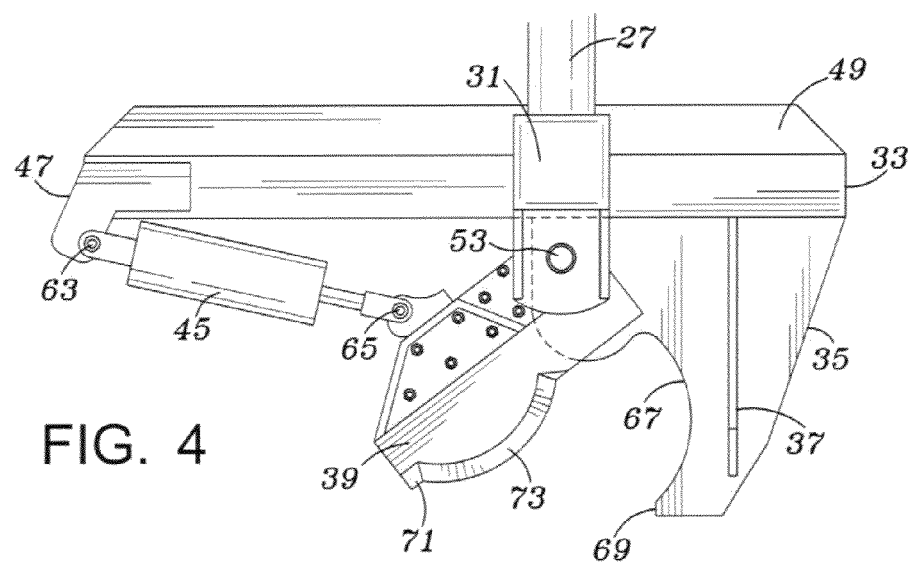
FIG. 4 is a top view of a portion of the tree cutter attachment with the cutting blade in a retracted position.

The drawings provided herein are meant to illustrate the principles of the invention in general terms and are not intended to limit the invention to the specific details shown in the drawings. Other shapes and sizes for the various structural members could be used without departing from the invention, which is set forth in the accompanying claims.

DETAILED DESCRIPTION OF THE INVENTION

As shown in FIG. 1, the shear tree cutter assembly 7 is adapted to be mounted on a front loading tractor 1 via a coupling frame 5. The frame 5 has upper and lower support beams 15 and 13, vertical end support members 17 and 19 and intermediate vertical support members 21 and 23.

A support plate 11 is fixed between vertical support members 21 and 23 by any suitable means such as welding. Mounting tabs (not shown) are positioned on the rear side of the frame 5 for attachment to the forks 3 of the tractor. A first hollow cylindrical member 25 is fixed to the plate 11 and a plurality of triangular reinforcing members 9 extend between the plate and the cylindrical member 25. Cylindrical member 25 includes two diagonally opposite apertures that receive pin 29.

The tree cutter attachment as shown in FIG. 2 includes a horizontally extending main support beam 33 which may be any suitable shape such as rectangular or square. Other configurations are also possible. Extending rearwardly of the beam is a stabilizing reinforcing plate 49. Extending forwardly from the beam 33 is an anvil plate 35 and a vertically extending reinforcing gusset plate 37 that is secured to the anvil plate 35 and beam 33. Anvil plate includes a concave surface 67 that supports the tree against lateral movement as the blade cuts through the tree. At its outer end the surface 67 includes a straight portion 69 that cooperates with a straight surface 71 on the blade.

A vertically extending support member 31 is rigidly secured to the beam 33. A hollow cylindrical tube 27 with an outside diameter slightly smaller than the inside diameter of cylinder 25 extends rearwardly from the support member 31. It includes a plurality of diagonally located pairs of apertures that can be aligned with the diagonal apertures in cylinder 25 so that the tube can be rotated and locked by pin 29 in a plurality of angular positions. In this manner, the tree cutter assembly 7 can be rotated about a horizontal axis that extends through cylinders 27 and 25. A lower pivot pin support plate 61 extends forwardly of the support member 31. A pair of triangular reinforcing plates 59 is provided between the lower plate 61 and support member 31. A circular collar 30 is secured to tube 27 and abuts against cylinder 25. Tube 27 extends through support plate 11 and a similar collar 30 is secured to a portion of the tube that extends beyond the support plate.

Figure 5:
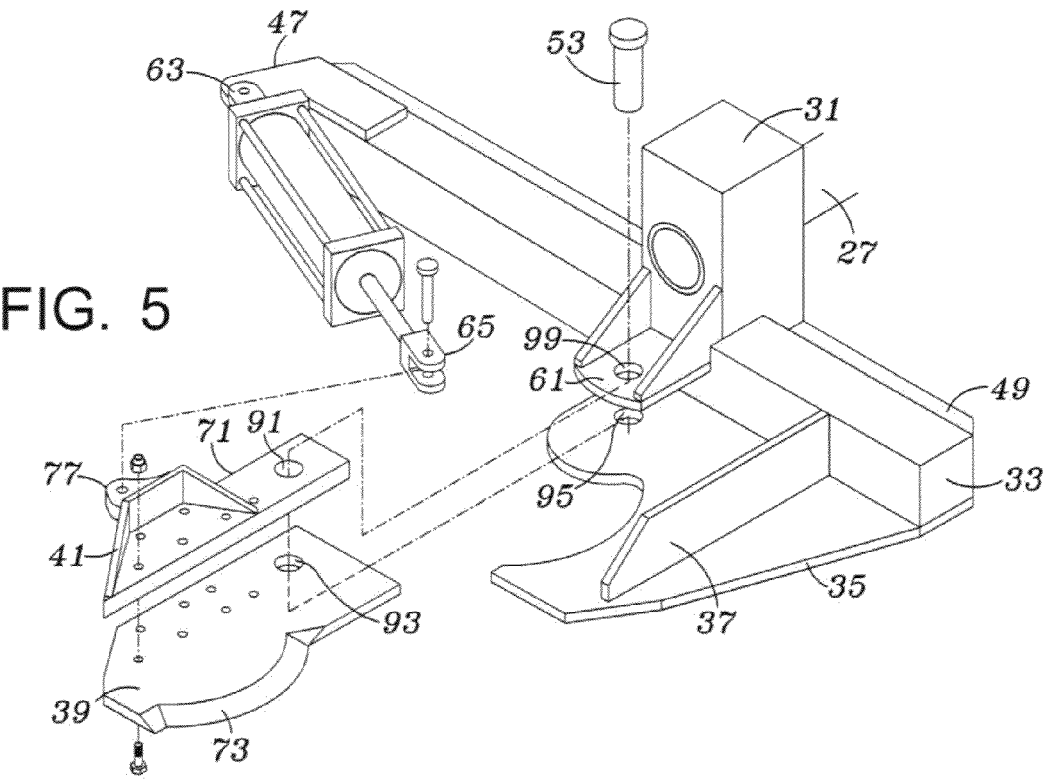
FIG. 5 is an exploded view of the various parts of the tree cutter.

The cutting blade assembly as shown in FIG. 5 includes a cutting blade 39 having a convex surface in a horizontal plane and a beveled portion 73 from the top to the bottom surface. An aperture 93 is provided through the blade. The assembly also includes a blade support member 71 having an aperture 91 and a three sided reinforcement member 41. A lug 77 extends outwardly from reinforcement member 41. Cutting blade 39 and blade support member 71 are detachably secured to each other with a plurality of threaded bolts 51.

As can be seen in FIG. 5, the cutting blade assembly 71 and 39 is pivotably mounted to the device by a support plate 61 and a portion of the anvil at aperture 95. Pin 53 slides through apertures 99, 91, 93 and 95 to rotatably support the blade assembly on the beam 33 and vertical support 31. Apertures 99 and 91 may be provided with hardened bushings so that pin 53 will experience any deterioration first and may simply be replaced. This arrangement provides an extremely rugged and reliable support for the blade.

A hydraulic power cylinder 45 has its base end pivotally connected to an angle support plate 47 that is rigidly attached to the support beam 33. The rod portion 43 of the hydraulic cylinder is pivotably connected to lug 77 of the cutter blade assembly at 65. Hydraulic lines (not shown) are connected to the hydraulic cylinder 45 as is known in the art to extend and retract rod 43. Thus blade 39 can be rotated about pin 53. In the fully extended position, blade 39 extends over the top surface of anvil 35 for about one inch.

Figure 6:
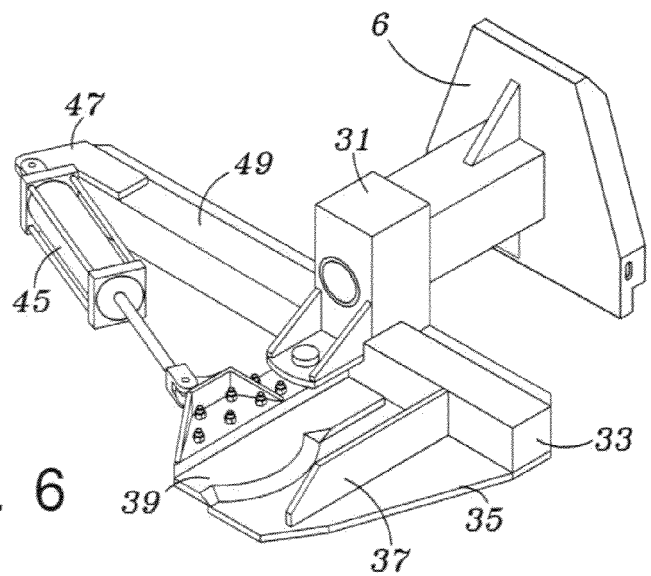
FIG. 6 is a perspective view of an alternative coupling for the attachment.

FIG. 6 illustrates an alternate embodiment of the coupling structure that is specially adapted for use with the coupling structure known as Rapidlink™ used for attaching accessories to Bobcat® utility vehicles. The connection 6 consists of a generally trapezoidal frame with apertures on either side. The frame is adapted to receive a trapezoidal shaped connection plate and locking rod that is mounted on the utility vehicle.

Although the present invention has been described with respect to specific details, it is not intended that such details should be regarded as limitations on the scope of the invention, except to the extent that they are included in the accompanying claims.

I claim:

1. A shear type tree cutter assembly for attachment to a field vehicle comprising:
    a main support beam;
    a vertically extending support member fixed to the main support beam;
    a coupling assembly extending rearwardly of the vertical support member;
    an anvil plate extending forwardly of the main support beam and rigidly attached thereto, the anvil plate including a concave portion for laterally supporting a tree to be cut down;
    a cutting blade assembly pivotably mounted to the vertically extending support member, said cutting blade assembly including a convex shaped cutting blade; and
    a hydraulic power cylinder having one end pivotably connected to the main support beam and an opposite end pivotably connected to the cutter blade assembly.

2. A shear type tree cutter assembly for attachment to a field vehicle comprising:
    a main support beam;
    an anvil plate extending forwardly of the main support beam and having a concave support surface for laterally supporting a tree to be cut;
    a cutting blade assembly pivotably mounted on the main support beam and having a convex blade portion adapted to ride over a portion of the anvil plate;
    a hydraulic power cylinder pivotably connected at one end to the main support beam and pivotably connected at the other end to the cutting blade assembly;
    a vertical support member secured to the main support beam and having a lower pivot pin support plate having an aperture therethrough;
    the anvil plate including an aperture, the cutting blade assembly including an aperture; and
    a pivot pin extending through the aperture in the lower pivot support plate, and extending through the apertures in the anvil plate and the cutting blade assembly for pivotably mounting the cutting blade assembly on the main support beam.

3. A shear type tree cutter assembly for attachment to a field vehicle according to claim 2 wherein the convex blade portion further includes a beveled section extending from a top portion of the cutting blade assembly to a lower bottom portion of the cutting blade assembly.

4. A tree cutter assembly according the claim 2 further including a first hollow cylindrical tube secured to the vertical support member and extending rearwardly therefrom, a second hollow cylindrical tube telescopically receiving the first hollow tube and attached to a support frame adapted to be coupled to a field vehicle, and
    means for rotatably securing the first and second tubes together in a plurality of angular positions.

5. A tree cutter assembly as claimed in claim 2 wherein the cutting blade assembly includes a cutter blade removably attached to the cutter blade assembly.

6. A shear type tree cutter assembly for attachment to a field vehicle comprising:
    a main support beam;
    an anvil plate extending forwardly of the main support beam and having a concave support surface for laterally supporting a tree to be cut;
    a cutting blade assembly pivotably mounted on the main support beam and having a convex blade portion adapted to ride over a portion of the anvil plate;
    a hydraulic power cylinder pivotably connected at one end to the main support beam and pivotably connected at the other end to the cutting blade assembly; and
    the blade assembly including a straight portion at one end and the anvil support surface includes a corresponding straight portion to allow for pruning of smaller size tree sprouts and branches.

* * * * *